United States Patent [19]

Zeineh et al.

[11] 4,082,668

[45] Apr. 4, 1978

[54] ULTRA FILTRATION APPARATUS AND METHOD

[76] Inventors: Rashid Ayoub Zeineh, 5742 W. Dakin St., Chicago, Ill. 60634; Richard Arthur Finley, 2306 E. Honeysuckle Ct., Lindenhurst, Ill. 60046

[21] Appl. No.: 394,260

[22] Filed: Sep. 4, 1973

[51] Int. Cl.² ............................................. B01D 13/00
[52] U.S. Cl. .................................. 210/129; 210/222; 210/321 R; 210/414
[58] Field of Search ............... 210/119, 136, 222, 223, 210/321, 332, 334, 129, 414; 55/158

[56] References Cited

U.S. PATENT DOCUMENTS

| | | | |
|---|---|---|---|
| 2,562,714 | 7/1951 | Hawtof | 210/222 X |
| 3,567,632 | 3/1971 | Richter et al. | 210/321 R |
| 3,568,835 | 3/1971 | Hansen | 210/119 X |
| 3,672,509 | 6/1972 | Buchmann | 210/321 A |
| 3,788,319 | 1/1974 | Gillette | 210/321 R |
| 3,807,562 | 4/1974 | Goda | 210/136 |

*Primary Examiner*—John Adee
*Attorney, Agent, or Firm*—McWilliams & Mann

[57] ABSTRACT

An ultrafiltration cell utilizing two membranes with a magnetic stirring bar system in between. This permits stacking of stirred cells and doubles the efficiency of each cell. Automatic stop to prevent drying is accomplished by employing a floating valve. When using compressed gas for pressure filtration, the floating valve sinks when empty and the valve mechanically stops gas pressure. When an electric motor pump is used, the floating valve keeps a switch on by pressing it upwards and shuts it off when it sinks. The switch could be magnetically or mechanically operated by the floating valve.

6 Claims, 4 Drawing Figures

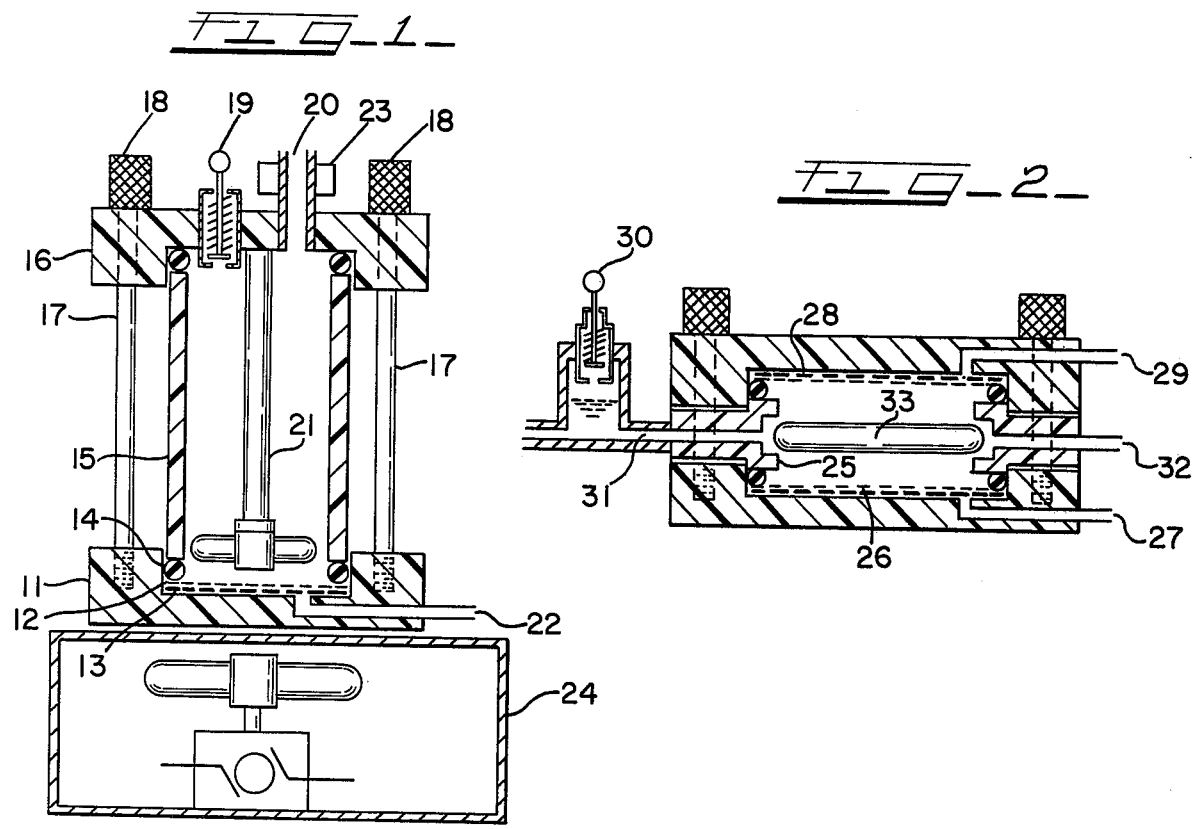
FIG_1_
FIG_2_
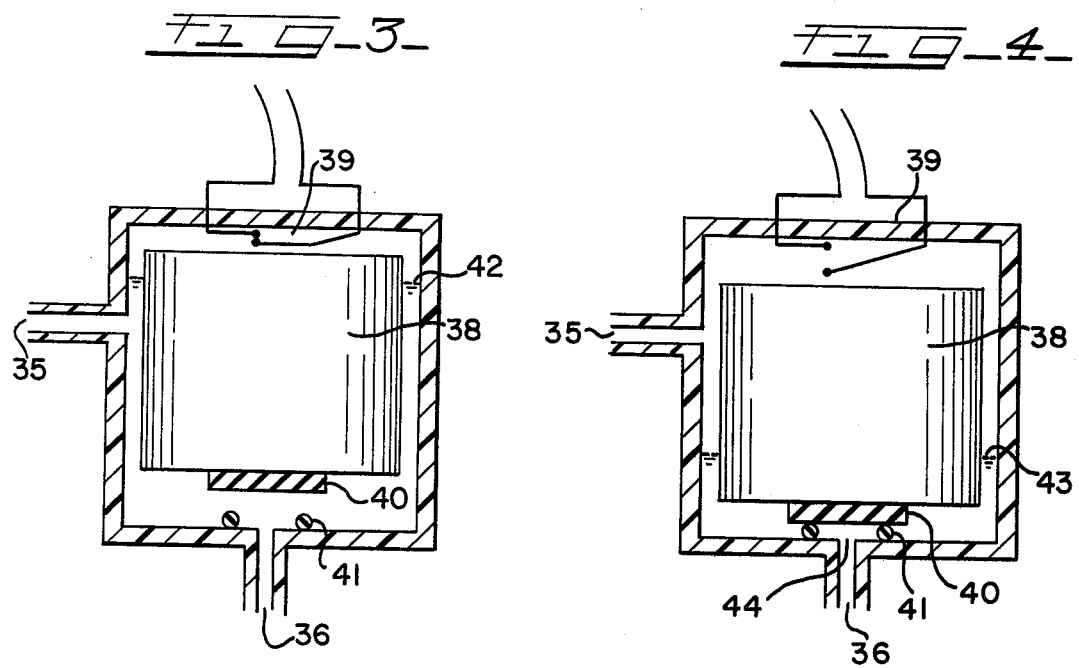
FIG_3_
FIG_4_

ULTRA FILTRATION APPARATUS AND METHOD

The present invention relates to an instrument for ultrafiltration of proteins and macromolecules in solution for the purpose of concentration or dialysis by ultrafiltration, and the use of a safety floating valve to prevent drying of the sample in unattended operation. There has been increased utility of stirred cells for ultrafiltration utilizing semipermeable membranes. All previous cells which employ stirring to prevent accumulation of proteins on the surface of membrane can use only one membrane. The stirring prolongs the life of the membrane by decreasing pore plugging. On the other hand there are many limitations for the present stirred cells: (1)they utilize only one membrane and the rate of ultrafiltration is thus limited. (2) The priming volume is large which leads to a larger load on the stirring bar which in turn leads to inefficient stirring. (3) Stacking is impossible because of the height of the cells. (4) Large volumes have to be concentrated in steps by concentrating with large cells and transfer of the sample to smaller cells to achieve small final volumes. (5) Series arrangement is not practical since the priming volume of each cell is large, some 400-1000 ml. Upon series arrangement the priming volume is too large and the first cell might dry, leading to irreversible damage to the membrane due to drying. (6) The membrane surface is small relative to the priming volume, thus the ratio of volume to active surface is small. This ratio is an indicator of efficiency, especially during dialysis. (7) All the previous art in ultrafiltration do not provide for safety against drying which leads to loss of concentrated sample by sticking or denaturation and also to membrane damage due to irreversible changes in the membrane which must be kept moist after initial wetting.

Our stirred cells with twin membrane systems, together with the floating safety valve removes these problems and improves ultrafiltration. Two membranes are utilized in each cell which doubles the ultrafiltration rate. The priming volume is significantly decreased, especially when using a flat magnetic bar or when the regular magnetic bar is embedded in a flat disc which can reduce the priming volume to 0.5–5.0 ml. depending on the diameter of the cell. This leads to efficient stirring because the load is less. Stacking of cells is now possible since one magnetic stirring bar is driven by the adjacent stacked cell's magnetic stirring bar, which is in turn, driven by the outer driving magnet. The magnetic stirring bars could also be driven by an induction pulsating magnetic field on the side of the stacked cells. The distance between the magnetic bar in each cell is small and the load is less to allow efficient chain effect for one magnetic bar to be driven by the adjacent bar. By series arrangement, large volumes could be concentrated to small volumes in a single step without the manual transfer processes that leads to time consumption and loss of material. In most cases the inlet tubing of the old type stirred cell has to be removed and a long needle with a soft plastic tip is necessary to remove the concentrate from the cell. In our system this removal of a sample could be accomplished better by having a special exit or outlet for the concentrate so continuous inflow-outflow is possible.

Our safety floating valve is new. The floating cylinder inside the safety valve works in two ways: (1) With pressurized gas operation or with a pumping system it mechanically shuts off the entrance of solution to the cell or series of cells by mere dropping and covering the outlet port. (2) If pressure is obtained by an electric motor pump, the floating cylinder activates an electrical switch. If the switch is inside the safety valve system, the activation is by pressure. If it is outside, the activation will be by a magnetic coupling, one magnet on the floating cylinder top and the other on the switch. When the fluid is emptied from the safety valve the cylinder sinks and opens the switch connected to the electric motor pump. Another main switch for the pump is for manual turn-on.

To make the invention more obvious the following figures are presented:

FIG. 1. The old type single membrane stirred ultrafiltration cell.

FIG. 2. The new double membrane stirred ultrafiltration cell.

FIG. 3. The safety valve against drying, in open position.

FIG. 4. The safety valve in closed position.

In detail, FIG. 1. shows the old type of cell. The base 11 is a piece of solid material such as nylon or plastic with a machined round circle into which the porous plastic support 12 fits. The membrane filter 13 is held and sealed by an o-ring 14 which is pressed down by cylinder 15. The upper plastic block 16 is held by four screws 17 and tightened by knurled knobs 18. The upper block 16 has openings for pressure relief valve 19 and pressure or sample inlet 20, and the hanging stirring bar assembly 21. The sample is placed in the cell and connected to a pressure source. The ultrafiltrate passing through the membrane leaves the cell through port 22. At the end of concentration, the pressure sample connection 23 is taken apart and a syringe with a long needle is introduced to collect the retentate. The magnetic stirring bar is driven by a motorized magnetic stirrer 24 placed under the cell. The bar is close to the membrane which produces a shear effect and prevents accumulation and stagnation of retained proteins or macromolecules which would plug the membrane pores. In FIG. 2, the stirring rod is supported by two hanging bars or strips or by another arrangement such as grooves in the short cylinder 25. The upper block is similar to the lower block and each contains two membrane assemblies with separate ultrafiltration outlets. In the lower block the ultrafiltrate from membrane 26 leaves the unit at port 27. Similarly, the ultrafiltrate from membrane 28 in the upper block, leaves the unit at port 29. The pressure relief valve is outside the unit 30 and connected to the cell by inlet 31. The concentrate is retrieved through outlet 32 which remains capped during the ultrafiltration process. Upon stacking the outlet 32 remains opened and connected to the inlet of the adjacent cell. A motorized magnetic stirrer is placed under the cell to drive the magnetic bar 33. The magnetic bar 33, which is in close proximity to the adjacent cell, is capable of driving the bar in the above placed cell upon stacking. Each bar will drive the upper near-by magnetic bar. In series arrangement, the first cells could be any suitable size to fit the need. The last cell, usually smaller in diameter, will have the majority of the retained proteins swept into it, where the concentrate can be easily drained or collected. The last cell serves more than just a collector because it also saves and prolongs the membranes in the cells which preceed it. The primary cells that are in the first part of the series arrangement contain the sample in the original dilution and minimal plugging is encountered. As you proceed towards the last cell in series, the concentration increases and more plugging occurs. The last cell plugs most, and it is better not to be part of the stacking, so that membrane changes can be made without the disassembly of the stacked cells. Operation of stacked cells could also be by parallel sample feed or with recirculation of the sample.

The safety valve which prevents drying, connects the sample reservoir to the cell or to the stacked cells. If the fluid level is maintained in the system, the floating cylinder valve will remain up as shown in FIG. 3, and the sample continues to flow from the reservoir to the cell. When the reservoir is empty, pressurized gas enters the system and the floating cylinder sinks and closes port 44 as shown in FIG. 4, and also opens the electric switch 39. In FIG. 3, the sample coming from reservoir enters the valve system through port 35 and leaves it through port 36 to the cell or cells, in parallel or in series. The fluid level is high at mark 42 and the floating cylinder valve 38 is holding switch 39 closed. As the reservoir empties, the fluid level lowers in the system to level 43, shown in FIG. 4. The floating cylinder valve lowers and opens the switch 39 upon release of pressure exerted by the floating cylinder valve 38. As the floating valve continues to lower, the smooth surface or rubber sheet 40 presses, or fits on rubber ring 41 to close port 44 so that no further pressure reaches the cells and ultrafiltration stops, preventing sample loss and damage to the membrane by drying.

Based upon this disclosure hereby we claim:

1. An instrument for ultrafiltration of proteins and macromolecules in solution comprising a unit of three parts including upper, middle and lower elements secured together by retaining means, said upper part comprising a membrane holder having a membrane filter, a porous disc support and an outlet for ultrafiltrate, said middle part including a magnetic stirrer bar assembly and having sample inlet and outlet ports, said lower part comprising a second membrane holder having a second membrane filter and a second porous disc and a second ultrafiltrate outlet port, said magnetic stirrer bar being driven to rotate by means of an external motorized magnetic bar under the lower element, said magnetic stirrer bar being located in proximity to the two said membrane filters but out of contact therewith during rotation of the stirrer bar, and sealing means between said middle part and said membrane filters, said membrane filters being of relatively large diameter and spaced relatively close together separated by said middle part.

2. An insturment as set forth in claim 1 with a safety valve and switch to protect said unit against drying of said membrane filters and the sample being processed, said valve including a float in a cylinder activated to close an outlet port and disconnect an electrical connection when the cylinder is empty of fluid, said cylinder having an inlet port and a bottom outlet port, said float having an elastic member to close said bottom outlet port and an embedded magnetic member on the top of the float whereby when the cylinder is full the float is in an upper position with the outlet port open and said magnetic member activates a switch to operate the ultrafiltration apparatus.

3. An instrument as set forth in claim 1 wherein said units are arranged to pass said sample from one cell to another in series relation.

4. An insturment as set forth in claim 2 wherein said safety valve is connected to a sample reservoir on one side and to said unit on the other side whereby the ultrafiltration system ceases operation when the valve system fills with gas.

5. An instrument as set forth in claim 2 wherein said safety valve stops the flow of pumped liquid by the opening of said electric switch.

6. An instrument as set forth in claim 2 wherein said valve automatically stops the flow of liquid by mechanically closing said outlet port.

* * * * *